US010306822B2

(12) United States Patent
Melanson et al.

(10) Patent No.: US 10,306,822 B2
(45) Date of Patent: Jun. 4, 2019

(54) AGRICULTURAL KNIFE ASSEMBLY

(71) Applicant: ONE PASS IMPLEMENTS INC., Langbank (CA)

(72) Inventors: Barry K. Melanson, Kennedy (CA); Patrick M. Beaujot, Kipling (CA); Bruce W. Wilton, Langbank (CA)

(73) Assignee: ONE PASS IMPLEMENTS INC., Langbank (CA)

( * ) Notice: Subject to any disclaimer, the term of this patent is extended or adjusted under 35 U.S.C. 154(b) by 86 days.

(21) Appl. No.: 15/596,821

(22) Filed: May 16, 2017

(65) Prior Publication Data

US 2018/0332762 A1 Nov. 22, 2018

(51) Int. Cl.
| | |
|---|---|
| *A01C 5/04* | (2006.01) |
| *A01C 5/06* | (2006.01) |
| *A01C 7/00* | (2006.01) |
| *A01C 7/06* | (2006.01) |
| *A01C 7/20* | (2006.01) |

(52) U.S. Cl.
CPC ............... *A01C 5/04* (2013.01); *A01C 5/062* (2013.01); *A01C 7/002* (2013.01); *A01C 7/06* (2013.01); *A01C 7/206* (2013.01)

(58) Field of Classification Search
CPC .. A01C 5/04; A01C 5/00; A01C 7/002; A01C 7/00; A01C 7/06; A01C 5/062; A01C 5/06; A01C 7/206; A01C 7/20
See application file for complete search history.

(56) References Cited

U.S. PATENT DOCUMENTS

| | | | | |
|---|---|---|---|---|
| 4,204,491 A | * | 5/1980 | Quick .................... | A01C 11/00 111/104 |
| 4,711,187 A | * | 12/1987 | Schultz .................. | A01C 5/062 111/123 |

* cited by examiner

*Primary Examiner* — Christopher J. Novosad
(74) *Attorney, Agent, or Firm* — Bennett Jones LLP

(57) ABSTRACT

A knife assembly mountable to a frame of a seeder comprises a knife shank having a proximal end and a distal end, the proximal end of the knife shank adapted to be directly or indirectly attached to the frame; a knife blade removably attached at or near the distal end of the knife shank; and a tube holder having a groove along a portion of its length, the groove designed to slidably receive a corresponding ridge on a flexible drop tube so that when a portion of the bottom of the flexible drop tube is worn, the flexible drop tube can be pulled from the bottom to slide down the groove and the worn portion can be cut off, the tube holder being attached at or near the distal end of the knife shank behind the knife blade so that both the knife blade and the flexible drop tube can be removed individually.

9 Claims, 4 Drawing Sheets

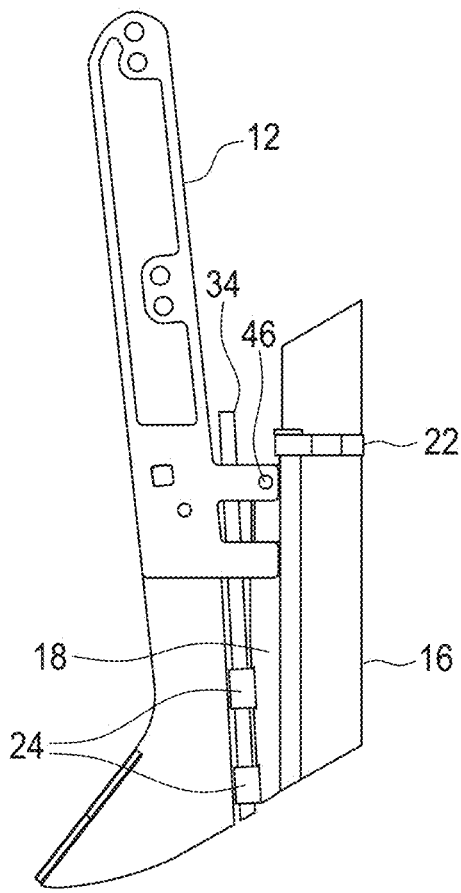
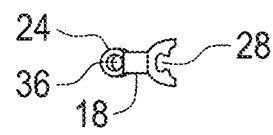
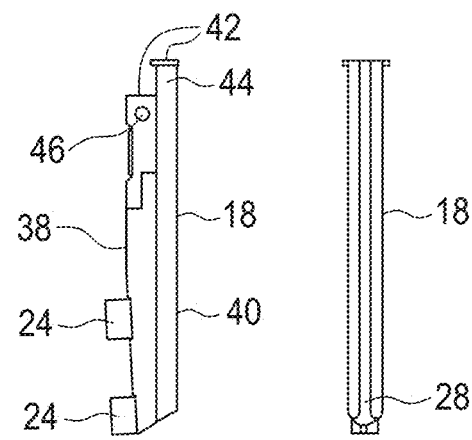
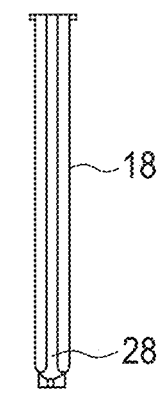
FIG. 4A  FIG. 4B  FIG. 4C
FIG. 4D
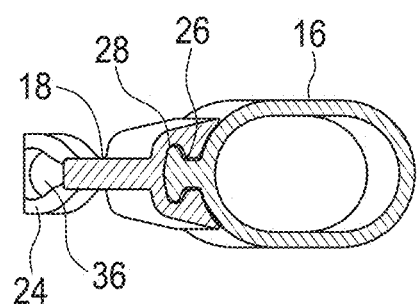
FIG. 5

AGRICULTURAL KNIFE ASSEMBLY

The present invention relates to an agricultural knife assembly for use with a seeder, planter and the like. The knife assembly is particularly useful for use in no-till farming.

BACKGROUND OF THE INVENTION

No-till farming (also called zero tillage or direct drilling) or cover crop farming is a way of growing crops from year to year without disturbing the soil through tillage. No-till is an agricultural technique which increases the amount of water that infiltrates into the soil and increases organic matter retention and cycling of nutrients in the soil. In many agricultural regions it can reduce or eliminate soil erosion. No-till seeding requires seeding into the previous year's crop residue and/or cover crops, which presents a number of challenges to no-till farmers.

Knife openers have become more popular than disc openers in no-till farming for several reasons. One reason is that, when using a disc to open the soil for the seed, the disc often pushes straw into the furrow where the seed is placed instead of cutting it. This is commonly referred to in the industry as "hair-pinning". Hair-pinning is common when using disc openers because the disc needs to be set to seed shallow. However, the disc needs to be set relatively deep to cut straw instead of hair-pinning it.

Another reason why knives have become popular in no-till farming is that the knives also aerate and warm the soil by leaving a black strip for the seed to germinate in. Knives also leave a small furrow for the seed to grow in, and, therefore, the furrow protects the seedling and stays moist longer than the small groove left by a disc opener.

Knife openers can be used for depositing seed, fertilizer and other such particulate material. In some instances, fertilizer knife openers can also be used to deposit liquid or anhydrous (anhydrous ammonia) fertilizer. Generally, knife openers are comprised of a leading knife or blade, followed by a fertilizer or seed drop tube. Each of these components may need to be replaced from time to time due to wear. However, there are instances where the fertilizer/seed drop tube may see excessive wear prior to the actual knife portion of the knife assembly, in particular, when granular or particulate materials are being deposited in the soil. On the other hand, in some instances, in particular, when the soil is particularly hard and/or abrasive, the knife may see unusual wear and need to be replaced prior to replacement of the drop tube.

Currently in the industry, most drop tubes are made of a hard material, such as steel, for greater wear protection. However, because no-till seeding often starts in wetter soils, steel drop tubes get plugged with mud, thereby stopping seed or fertilizer from getting to the soil. This causes considerable down time for the seeding operation and unwanted missed strips in the field. The present applicant has observed that the use of a more flexible drop tube, such as a rubber drop tube, plugs less that steel drop tubes because the rubber tube flexes to allow the mud to dislodge and be blown out of the tube. Also, flexible drop tubes such a rubber drop tube are less expensive than steel. The disadvantage of rubber drop tubes, however, is that they can wear quicker than steel. However, if a properly designed mounting means is provided where the flexible tube can be slid down slightly and the worn tip cut off, it would make for relatively quick and cost efficient maintenance. Further, the height of the flexible drop tube would be easy to set by the grower.

There is a need in the industry for a knife assembly comprising a flexible drop tube that is easy to assemble and where the various components can be replace due to wear independently from the other components.

SUMMARY OF THE INVENTION

In a first aspect, a knife assembly mountable to a frame of a seeder is provided, comprising:
  a knife shank having a proximal end and a distal end, the proximal end of the knife shank adapted to be directly or indirectly attached to the frame;
  a knife blade removably attached at or near the distal end of the knife shank; and
  a tube holder having a groove along a portion of its length, the groove designed to slidably receive a corresponding ridge on a flexible drop tube, the tube holder being attached at or near the distal end of the knife shank behind the knife blade;
  whereby both the knife blade and the flexible drop tube can be removed individually without disturbing the other elements of the knife assembly.

In one embodiment, the flexible drop tube is made of rubber. In one embodiment, the flexible drop tube is designed to receive a product hose at its first end and deposit granular material at its second end, which product hose can be secured to the flexible drop tube by means of a hose clamp.

In one embodiment, the tube holder is removably attached to the knife shank by means of a fastener such as roll pins or a small bolt and the like. In one embodiment, the knife shank comprises a notch and the tube holder comprises a tab designed to fit in the notch to further hold the tube in place on the knife shank. However, it is understood that, in some embodiments, the tube holder and the knife shank could be manufactured as a single piece.

In one embodiment, the tube holder further comprises at least one tube bracket forming an aperture for receiving a second hose for dispensing a liquid or gaseous product such as liquid fertilizer or anhydrous fertilizer, for example, anhydrous ammonia.

In one embodiment, the knife assembly is a fertilizer knife assembly. In one embodiment, the knife assembly is a seed knife assembly.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein:

FIG. 4A is a side elevational view of the knife assembly of FIG. 1A having a second product tube.

FIG. 4B is a side elevational view of one embodiment of a tube holder useful in the present invention.

FIG. 4C is a back elevational view of the tube holder shown in FIG. 4B.

FIG. 4D is a top plan view of the tube holder shown in FIG. 4B.

FIG. 5 is a top perspective view of a tube holder and a flexible drop tube useful in the present invention.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

There is a need in the industry for a knife assembly that may be attached to a seeder, planter, fertilizer, and the like, which is easy to assemble and where the various components can be replace due to wear independently from the other components.

Figure 1A:
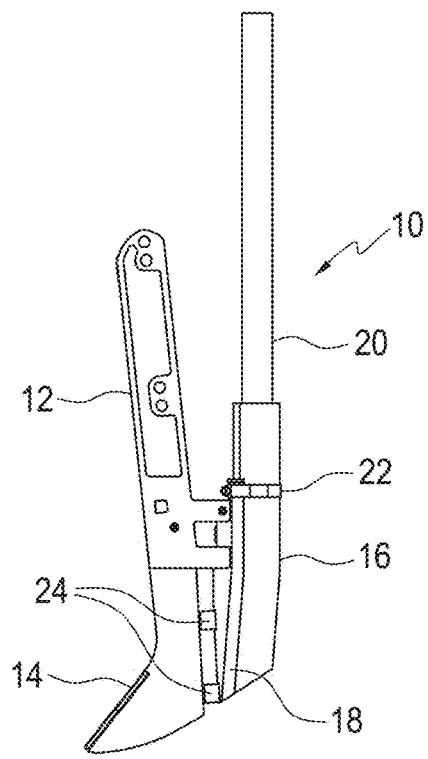
FIG. 1A is a side elevational view of one embodiment of a knife assembly of the present invention.
Figure 1B:
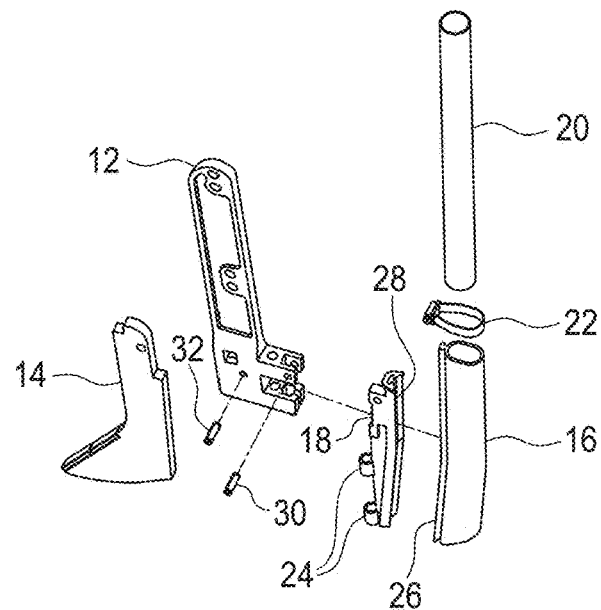
FIG. 1B is an exploded perspective view of the knife assembly of FIG. 1A.

With reference now to FIG. 1A, a side elevational view of one embodiment of a knife assembly of the present invention, and FIG. 1B, an exploded perspective view of the knife assembly of FIG. 1A, knife assembly 10 is particularly useful for applying fertilizer to the ground (also referred to herein as a fertilizer knife assembly). In this embodiment, knife assembly 10 comprises a knife shank 12, which may be attached to a frame of a seeder by means of a trailing arm (not shown). Removably attached to knife shank 12 is knife 14, which, in this embodiment, is a fertilizer knife, which knife 14 engages the ground to form a furrow for depositing either granular fertilizer, liquid/anhydrous fertilizer, or both. Knife 14 may be attached to the knife shank 12 by means of knife pin 32, for easy removal when the fertilizer knife becomes worn and needs replacing.

Further attached to the knife shank 12 is a tube holder 18, which, in some embodiments, is removably attached to the knife shank 12 by holder pin 30. Preferably, knife 14 and tube holder 18 are attached to knife shank 12 at different positions and, therefore, each can be removed/replaced independently from one another. Tube holder 18 comprises a groove 28 which is sized and shaped to slidably receive a flexible drop tube 16 having a corresponding ridge 26. Flexible drop tube 16 can be manufactures from a flexible material such as a thermoplastic elastomer, such as thermoplastic vulcanizates (e.g., Santoprene™), rubber, vulcanized rubber, and synthetic rubber, such as ethylene propylene diene monomer (EPDM) rubber, and the like. Thus, when the bottom of the flexible drop tube 16 gets worn due to the granular product being dispensed and the soil rubbing on the sides of the tube, the flexible drop tube 16 can pulled at its bottom and slide down the groove 28, the worn portion of the drop tube cut off, and then the fertilizing operation can commence again without the need for lengthy downtimes. In one embodiment, tube holder 18 further comprises a pair of brackets 24 forming two apertures for snuggly receiving a second product tube 34 (shown in FIG. 3A), which tube is adapted for applying liquid fertilizer or anhydrous ammonia and is preferably made of a material which will withstand contact with chemicals normally used in farming operations and long periods of exposure to moisture such that it will not rustl.

It is understood that the tube holder and knife shank could be formed as a single, integral part. Generally, it has been found that the knife and the flexible drop tube will wear out much faster than the tube holder and both will likely need to be replaced before the tube holder. However, the tube holder may eventually have wear issues at its bottom and need replacing. Hence, in a preferred embodiment, the tube holder will be removably attached to the knife shank so that all three components, i.e., knife, flexible drop tube and tube holder, can be individually removed and replaced.

Attached to the top of flexible drop tube 16 is product hose 20, which has a slightly smaller outer diameter than the inner diameter of the drop tube for a snug fit into the flexible drop tube 16. In one embodiment, a clamp 22 may be used to ensure that the product hose 20 does not separate from the flexible drop tube 16. The clamp 22 may also be attached to the tube holder 18 to prevent the flexible drop tube from sliding up or down out of proper position. Product hose 20 is attached at its other end to a product tank, generally, via some type of metering device (not shown).

Figure 2A:
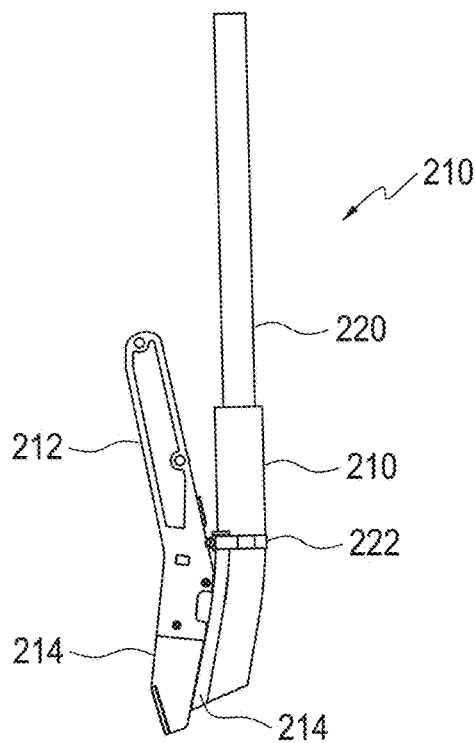
FIG. 2A is a side elevational view of another embodiment of a knife assembly of the present invention.
Figure 2B:
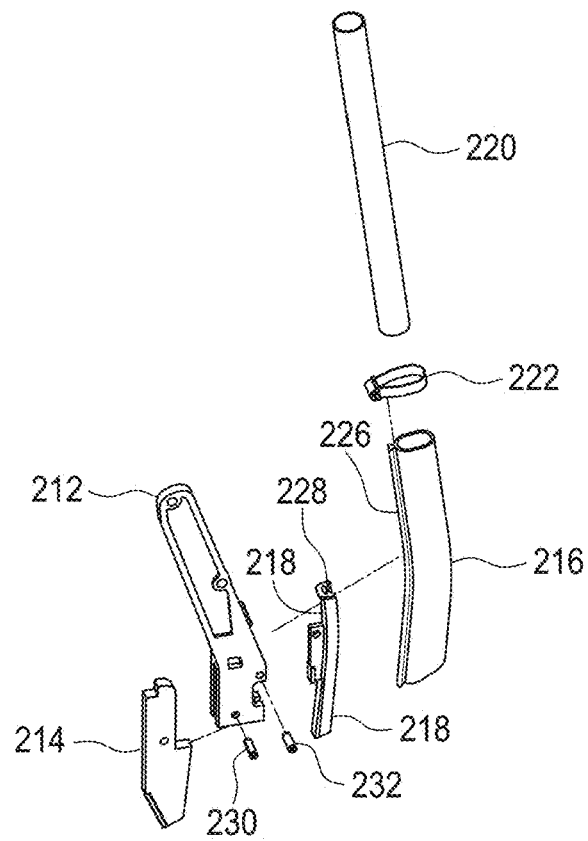
FIG. 2B is an exploded perspective view of the knife assembly of FIG. 2A.

With reference now to FIG. 2A, a side elevational view of another embodiment of a knife assembly of the present invention, and FIG. 2B, an exploded perspective view of the knife assembly of FIG. 2A, knife assembly 210 is particularly useful for applying granular seed to the ground (also referred to herein as a seed knife assembly). In this embodiment, knife assembly 210 comprises a knife shank 212, which may be attached to a frame of a seeder by means of a trailing arm (not shown). Removably attached to knife shank 212 is knife 214, which, in this embodiment, is a seed knife, which knife 214 engages the ground to form a furrow for depositing a granular material such as seed. Knife 214 may be attached to the knife shank 212 by means of knife pin 230, for easy removal when the seed knife becomes worn and needs replacing.

Further attached to the knife shank 212 is a tube holder 218, which, in some embodiments, is removably attached to the knife shank 212 by holder pin 232. Preferably, knife 214 and tube holder 218 are attached to knife shank 212 at different positions and, therefore, each can be removed/replaced independently from one another. Tube holder 218 comprises a groove 228 which is sized and shaped to slidably receive a flexible drop tube 216 having a corresponding ridge 226. Flexible drop tube 216 can be manufactures from a flexible material such as rubber and the like. Thus, when the bottom of the flexible drop tube 216 gets worn due to the continuous dropping of a granular material such as seed, the flexible drop tube 216 can pulled at its bottom and slide down the groove 228, the worn portion of the drop tube cut off, and then the seeding operation can commence again without the need for lengthy downtimes. Attached to the top of flexible drop tube 216 is product hose 220, which has a slightly smaller outer diameter than the inner diameter of the drop tube for a snug fit into the flexible drop tube 216. In one embodiment, a clamp 222 may be used to ensure that the product hose 220 does not separate from the flexible drop tube 216. Product hose 220 is attached at its other end to a product tank, generally, via some type of metering device (not shown).

Figure 3:
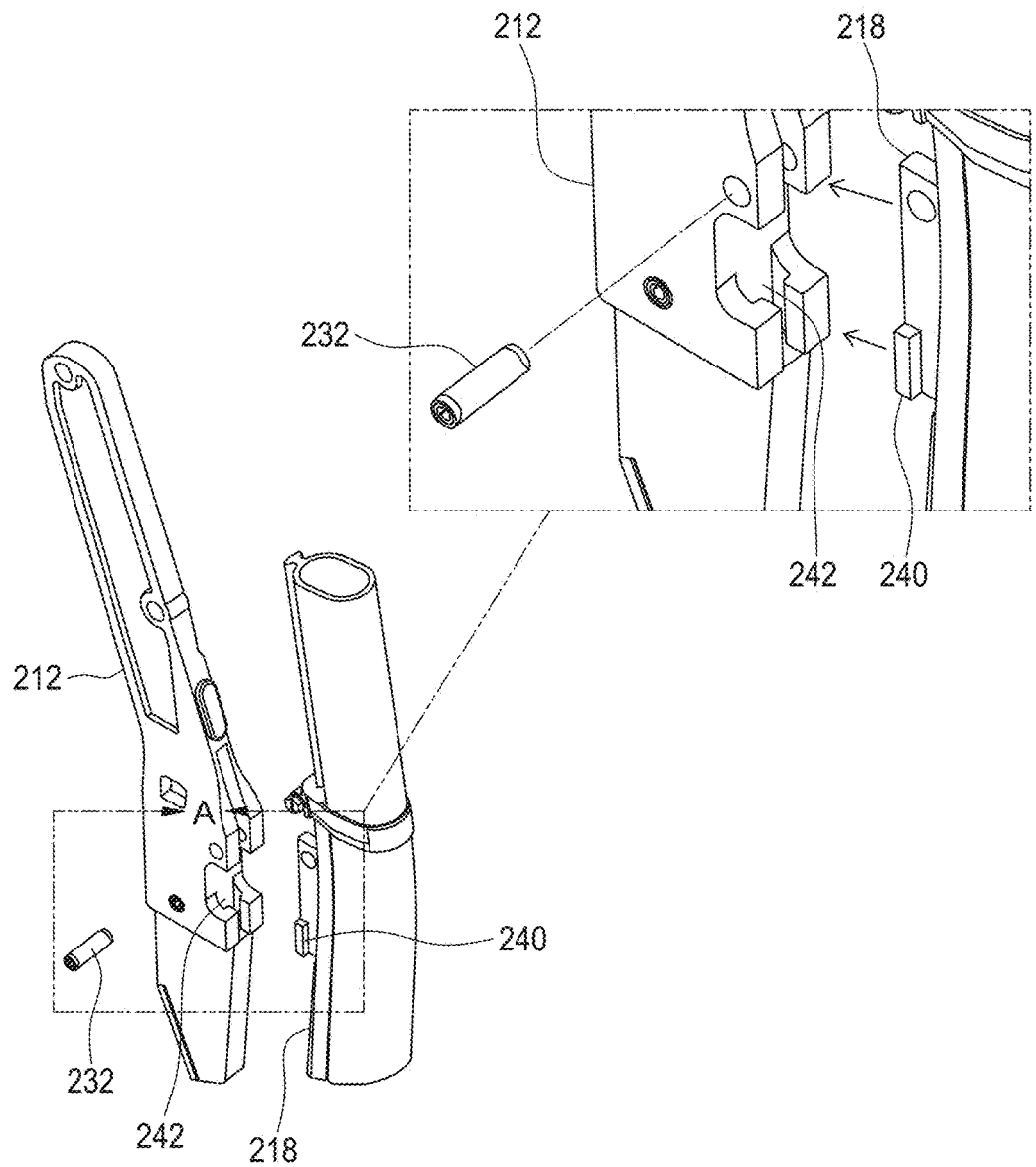
FIG. 3 is a perspective view of a knife assembly of the present invention showing, in more detail, the attachment of the tube holder to the knife shank.

Seed placement inside the furrow formed by the seed knife is more important than fertilizer placement. In particular, it is important that the seed is placed on firm, undisturbed soil in the very bottom of the seed furrow created by the seed knife. Thus, placement of the flexible rubber hose as close to the knife as possible and lower to the ground will prevent loose soil from flowing back into the newly formed furrow before the seed is dropped into the furrow. FIG. 3 shows in more detail how tube holder 218 can be secured to the knife shank 212 by holder pin 232 and further secured to knife shank 212 by inserting tab 240 of tube holder 218 into notch 242 formed in knife shank 212.

With reference now to FIGS. 4A, B, C and D. FIG. 4A shows the fertilizer knife assembly of FIG. 1A, where a second product tube 34 for dispensing a liquid or anhydrous product is also received by tube holder 18. Product tube 34 has an outer diameter which allows the product tube 34 to fit snuggly through brackets 24, each bracket 34 having an annulus 36 (FIG. 4D) that has an outer diameter slightly larger than the outer diameter of product tube 34, for holding the product tube 34 snuggly in place. FIG. 4B is a side view of tube holder 18, the tube holder 18 having a hole 46 at or near its top 42 for receiving a pin to secure the tube holder 18 to the knife shank 12. The brackets 24 are secured to the front 38 of tube holder 18 and the groove 28 for receiving the drop tube is positioned on the back 40 of tube holder 18. FIG. 4C is the back view of tube holder 18 which shows more clearly the groove 28 for receiving the corresponding ridge of a drop tube. FIG. 4D is a top plan view of the tube holder 18, showing groove 28 for receiving the flexible drop tube for dispensing granular fertilizer and annulus 36 formed by clamps 24 for receiving second product tube for dispensing liquid or anhydrous fertilizer. In one embodiment, the top 42 of tube holder 18 has a raised portion 44 for allowing hose clamp 22 to secure the product hose in the drop tube by clamping both to tube holder 18.

FIG. 5 is a top perspective view of a tube holder 18 having a flexible drop tube 16 inserted therethrough. It can be seen that the ridge 26 of flexible drop tube 16 can be slidably received by groove 28 for a snug fit so that the flexible drop tube remains in place during use but can still slide through the groove 28 when a bottom portion of the tube needs to be removed due to wear. FIG. 5 also shows bracket 24 having an annulus 36 therethrough for receiving a second product tube.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A knife assembly mountable to a frame of a seeder, comprising:
 a knife shank having a proximal end and a distal end, the proximal end of the knife shank adapted to be directly or indirectly attached to the frame;
 a knife blade removably attached at the distal end of the knife shank; and
 a tube holder having a groove along a portion of the tube holder's length, the groove designed to slidably receive a corresponding ridge on a flexible drop tube so that when a portion of the bottom of the flexible drop tube is worn, the flexible drop tube can be pulled from the bottom to slide down the groove and the worn portion can be cut off, the tube holder being attached at the distal end of the knife shank behind the knife blade;
whereby both the knife blade and the flexible drop tube can be removed individually.

2. The knife assembly of claim 1, wherein the flexible drop tube is made of a flexible material selected form the group consisting of a thermoplastic elastomer, thermoplastic vulcanizates, rubber, vulcanized rubber, and synthetic rubber including ethylene propylene diene monomer rubber.

3. The knife assembly of claim 1, wherein the flexible drop tube is designed to receive a product hose at the drop tube's first end and deposit granular material at the drop tube's second end.

4. The knife assembly of claim 3, wherein the product hose is secured to the flexible drop tube by means of a hose clamp.

5. The knife assembly of claim 1, wherein the tube holder is removably attached to the knife shank by means of a fastener including a roll pin.

6. The knife assembly of claim 5, wherein the tube holder further comprises a tab and the knife shank further comprises a notch sized and shaped for receiving the tab of the tube holder.

7. The knife assembly of claim 1, wherein the tube holder further comprises at least one bracket forming an aperture for receiving a second hose for dispensing a liquid or gaseous product.

8. The knife assembly as claimed in claim 1, wherein the knife blade is a fertilizer knife and the flexible drop tube dispenses granular fertilizer.

9. The knife assembly as claimed in claim 1, wherein the knife blade is a seed knife and the flexible drop tube dispenses granular seed.

* * * * *